May 18, 1926.

W. V. VAN ETTEN 1,584,908

DIRIGIBLE HEADLIGHT

Filed July 14, 1924

INVENTOR
WILLIAM V. VAN ETTEN
BY
Richard J. Cook
ATTORNEY

Patented May 18, 1926.

1,584,908

UNITED STATES PATENT OFFICE.

WILLIAM V. VAN ETTEN, OF EVERETT, WASHINGTON.

DIRIGIBLE HEADLIGHT.

Application filed July 14, 1924. Serial No. 725,848.

This invention relates to improvements in auxiliary headlights for motor vehicles, and more particularly to a dirigible headlight of that character adapted for support from a steering knuckle of the vehicle so that the direction of light may be made to change with and conform to the direction of travel of the vehicle.

The principal object of this invention is to provide a lamp mounting bracket of novel construction that may be easily and readily applied and from which a lamp may be supported in a conveniently, accessible position and in a rigid and substantial manner.

Other objects reside in the details of construction and combination of parts embodied in the invention and in their mode of assembly.

In accomplishing these and other objects of the invention, I have provided the improved details of construction, the preferred forms of which are illustrated in the accompanying drawings, wherein—

Figure 1:
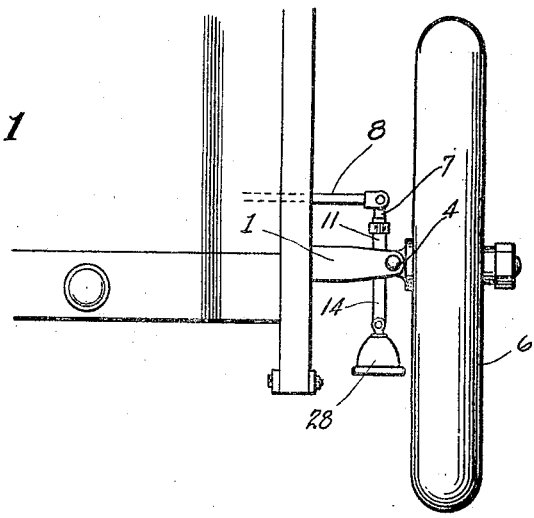
Figure 1 is a partial plan view of an automobile equipped with a headlight in accordance with the present invention.
Figure 2:
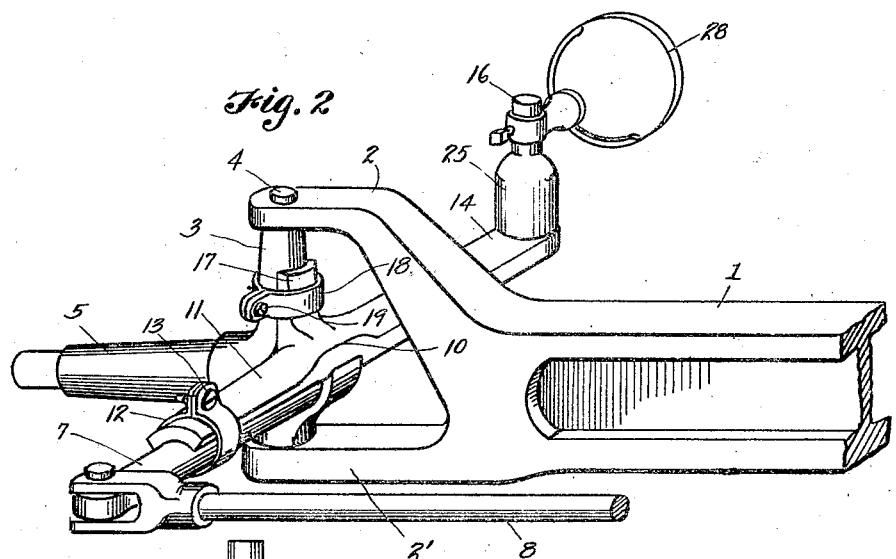
Figure 2 is an enlarged perspective view showing the lamp supporting bracket and the means for and manner in which it is fixed to the steering knuckle.
Figure 3:
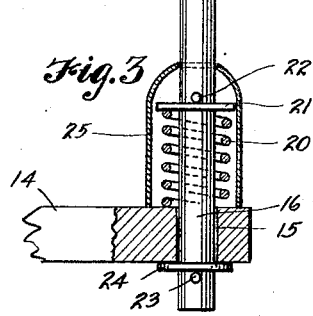
Figure 3 is a detail view showing the yieldable mounting for the lamp supporting post.

Referring more in detail to the drawings—

1 designates the front axle of an automobile, or similar vehicle, having yoke arms 2—2' at its end between which a steering knuckle 3 is pivotally mounted on a vertical pin 4; the knuckle being of the usual form having a spindle 5 on which the front, ground wheel 6 is mounted and having a steering arm 7 fixed thereto and extending rearwardly and connected at its end with one end of the steering knuckle connecting rod 8, through which operative connection is made with the vehicle steering gear.

10 designates, in its entirety, a lamp supporting bracket embodied by the present invention and which comprises a horizontal bar with an inner end portion 11 adapted to overlie the steering arm 7 to which it is detachably fixed by means of an encircling collar 12 clamped tight and held thereabout by means of a bolt 13 through its ends. The forward end portion 14 of the bar extends forwardly from the yoke a suitable distance and at its end has a vertical hole 15 in which a lamp mounting post 16 is slidably held.

Formed integral with the bar, toward its rearward end, is an upwardly extending arm 17 adapted to lie against the knuckle 3 along its inner face and a collar 18 encircles the knuckle and arm and is drawn tight by a bolt 19 to secure them rigidly together.

The lamp post 16 is yieldably supported by means of a coiled spring 20 that encircles the same and which rests at its lower end upon the bar and at its upper end bears against a washer 21 that seats against a pin 22 through the post. Upward movement of the post is limited by means of a pin 23 through its lower end portion on which a washer 24 rests in engagement with the underside of the bar. A dust proof cap 25 encloses the spring to protect it and to enhance the appearance of the device.

At the upper end of the post 16 is fixed a spotlight 28 which may be of any suitable type of construction and which does not constitute a part of the present invention.

With the bracket as constructed, it is apparent that it may be easily and quickly attached or removed and with the lamp mounted thereon, as shown, the direction of light therefrom can be made to change with and conform to the direction of travel of the vehicle.

Having thus described my invention, what I claim as new therein and desire to secure by Letters-Patent, is:

1. The combination with a vehicle having a front axle provided with a steering knuckle with steering arm fixed thereto, of a lamp mounting bracket comprising a horizontal bar extending forwardly from the knuckle having an inner end portion adapted to overlie the said arm and having an upwardly extending arm disposed against the knuckle, a lamp supporting post at the forward end of the bar and collars encircling the arm and knuckle and parts of the bracket disposed thereagainst for detachably fixing the same thereto.

2. The combination with a vehicle having a front axle provided at its end with a yoke and a steering knuckle mounted on the yoke having a vertical axis and steering arm fixed thereto and extended rearwardly therefrom, of a lamp mounting bracket disposed within the yoke portion of the axle comprising, a horizontal bar extending forwardly from the knuckle having its inner end portion adapted to overlie the steering arm and having an integral, upwardly extending arm disposed against the axial portion of the knuckle, a vertical lamp, supporting posts slidably mounted at the forward end of the bar with a limited upward movement and a coiled spring encircling the post and having connection therewith for yieldably retaining it against downward movement and removable collars encircling the arm and knuckle and the parts of the bracket disposed thereagainst for detachably fixing the same thereto.

Signed at Everett, Snohomish County, Washington, this 30th day of June 1924.

WILLIAM V. VAN ETTEN.